United States Patent
Weber et al.

(10) Patent No.: US 8,880,458 B2
(45) Date of Patent: Nov. 4, 2014

(54) DATA AND META DATA VARIANTS EXTENDING ACTUAL DATA FOR PLANNING

(71) Applicant: SAP AG, Walldorf (DE)

(72) Inventors: Franz Weber, Walldorf (DE); Uwe Fischer, Karlsruhe (DE)

(73) Assignee: SAP AG, Walldorf, DE (US)

( * ) Notice: Subject to any disclaimer, the term of this patent is extended or adjusted under 35 U.S.C. 154(b) by 14 days.

(21) Appl. No.: 13/678,296

(22) Filed: Nov. 15, 2012

(65) Prior Publication Data

US 2014/0136470 A1     May 15, 2014

(51) Int. Cl.
*G06F 17/30*          (2006.01)
*G06Q 10/06*       (2012.01)

(52) U.S. Cl.
CPC .......... *G06F 17/30309* (2013.01); *G06Q 10/06* (2013.01)
USPC .......................................... 707/600; 707/695

(58) Field of Classification Search
None
See application file for complete search history.

(56) References Cited

U.S. PATENT DOCUMENTS

| | | | | |
|---|---|---|---|---|
| 5,386,559 | A * | 1/1995 | Eisenberg et al. | 707/695 |
| 2004/0210607 | A1 * | 10/2004 | Manchanda et al. | 707/203 |
| 2004/0249867 | A1 * | 12/2004 | Kraiss et al. | 707/203 |
| 2010/0088334 | A1 * | 4/2010 | Wasserman et al. | 707/769 |
| 2010/0280991 | A1 * | 11/2010 | Chen et al. | 707/602 |
| 2012/0084257 | A1 * | 4/2012 | Bansode et al. | 707/638 |

OTHER PUBLICATIONS

Internet article, "Two-Dimensional Versioning / Use", retrieved from http://help.sap.com/saphelp_banking60//helpdata/en/43/f053b077a76beee10000000a11466f/content.htm Printed Oct. 10, 2012.
Internet article, "Two-Dimensional Versioning with Logical Delete", retrieved from http://help.sap.com/saphelp_banking60//helpdata/en/4d/ad8ca884ca406891fa24d96cc78e89/content.htm Printed Oct. 10, 2012.
Article entitled "Technical Architecture Overview—SAP BPC", SAP FKOM 08. Copyright 2007 SAP AG.

* cited by examiner

*Primary Examiner* — Tony Mahmoudi
*Assistant Examiner* — Umar Mian
(74) *Attorney, Agent, or Firm* — Founainhead Law Group PC

(57) ABSTRACT

Embodiments implement data and meta data versioning in order to adapt reported data ("actuals") for planning purposes. A versioning engine receives from an operative system (e.g. ERP system), root variants. These root variants may comprise existing actual data and corresponding underlying corporate meta data. Based upon user input, the versioning engine creates from these root variants, additional variants of the data and/or meta data. A new data variant may be based upon the original corporate meta data unchanged (e.g. for projecting existing product lines). A data variant may alternatively be based upon a new meta data variant reflecting changes to the original corporate meta data (e.g. for adopting an entirely new product line). By effectively depicting relationships between actual data and plan data, and between that data and its underlying meta data, versioning allows a user to visualize evolution of actual data into plan data for forecasting purposes.

6 Claims, 7 Drawing Sheets

DATA AND META DATA VARIANTS EXTENDING ACTUAL DATA FOR PLANNING

BACKGROUND

Embodiments of the present invention relate to systems and methods of handling different versions of data for planning applications, and in particular to tracking the evolution of data versions and allowing comparison between different data versions.

Unless otherwise indicated herein, the approaches described in this section are not prior art to the claims in this application and are not admitted to be prior art by inclusion in this section.

Data stored in data warehouses have historically been used for reporting purposes. Such data reporting applications are backward-looking, in that there exists a single truth (hereafter "actual data" or "actuals"), corresponding to what actually occurred in the past.

Increasingly however, data stored in data warehouses are also being utilized for forecasting or planning purposes. Such data planning applications are forward-looking, in that there exist a number of different possible options (hereafter "plan data") based on unmade decisions or other as-yet undetermined influencing factors.

Such undetermined influencing factors can result in deviation from a pure extrapolation from the past, but still are to a large extent related to the past data. It is thus desirable for planning applications to be able to extend reporting data, such that different options can be reflected in a consistent manner.

Accordingly, the present disclosure addresses these and other issues with methods and systems of handling different versions of data for planning applications.

SUMMARY

Embodiments implement data and meta data versioning in order to adapt reported data ("actuals") for planning purposes. A versioning engine receives from an operative system (e.g. ERP system), root variants. These root variants may comprise existing actual data and corresponding underlying corporate meta data. Based upon user input, the versioning engine creates from these root variants, additional variants of the data and/or meta data. A new data variant may be based upon the original corporate meta data unchanged (e.g. for projecting existing product lines). A data variant may alternatively be based upon a new meta data variant reflecting changes to the original corporate meta data (e.g. for adopting an entirely new product line). By effectively depicting relationships between actual data and plan data, and between that data and its underlying meta data, versioning allows a user to visualize evolution of actual data into plan data for forecasting purposes. Embodiments may support comparison of plan data such that plans on a same meta data (e.g. same product lines) are comparable.

An embodiment of a computer-implemented method comprises causing a versioning engine to receive data and meta data from a data warehouse, causing the versioning engine to receive a first instruction from an interface engine, and causing the versioning engine to create a first data variant and a corresponding first meta data variant based upon the first instruction. The versioning engine is caused to communicate with the interface engine to display a representation of the data, the meta data, the first data variant, the first meta data variant, and a relationship between the first data variant and the first meta data variant.

An embodiment of a non-transitory computer readable storage medium embodies a computer program for performing a method comprising causing a versioning engine to receive data and meta data from a data warehouse, causing the versioning engine to receive a first instruction from an interface engine, and causing the versioning engine to create a first data variant and a corresponding first meta data variant based upon the first instruction. The versioning engine is caused to communicate with the interface engine to display a representation of the data, the meta data, the first data variant, the first meta data variant, and a relationship between the first data variant and the first meta data variant.

An embodiment of a computer system comprises one or more processors and a software program executable on said computer system. The software program is configured to cause a versioning engine to receive data and meta data from a data warehouse, cause the versioning engine to receive a first instruction from an interface engine, and cause the versioning engine to create a first data variant and a corresponding first meta data variant based upon the first instruction. The versioning engine is caused to communicate with the interface engine to display a representation of the data, the meta data, the first data variant, the first meta data variant, and a relationship between the first data variant and the first meta data variant.

According to certain embodiments the data comprises actual data, the instruction comprises creating a plan from the actual data, and the first data variant comprises a root data variant.

Various embodiments further comprise causing the versioning engine to receive a second instruction from an interface engine, causing the versioning engine to create a plan data variant from the root data variant based upon the second instruction, and causing the versioning engine to communicate with the interface engine to display a representation of the plan data variant and a relationship between the plan data variant and the root data variant.

Some embodiments further comprise causing the versioning engine to create a second meta data variant based upon the second instruction, and causing the versioning engine to communicate with the interface engine to display a representation of the second meta data variant and a relationship between the second meta data variant and the plan data variant.

In some embodiments the plan data variant comprises a new type of information not present in the root data variant, and the second meta data variant references the new type of information.

In particular embodiments the relationship is established by delta or by after-imaging.

In various embodiments the representation comprises a timeline or a tree.

The following detailed description and accompanying drawings provide a better understanding of the nature and advantages of particular embodiments.

DETAILED DESCRIPTION

Described herein are techniques for handling different versions of data for planning applications. The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
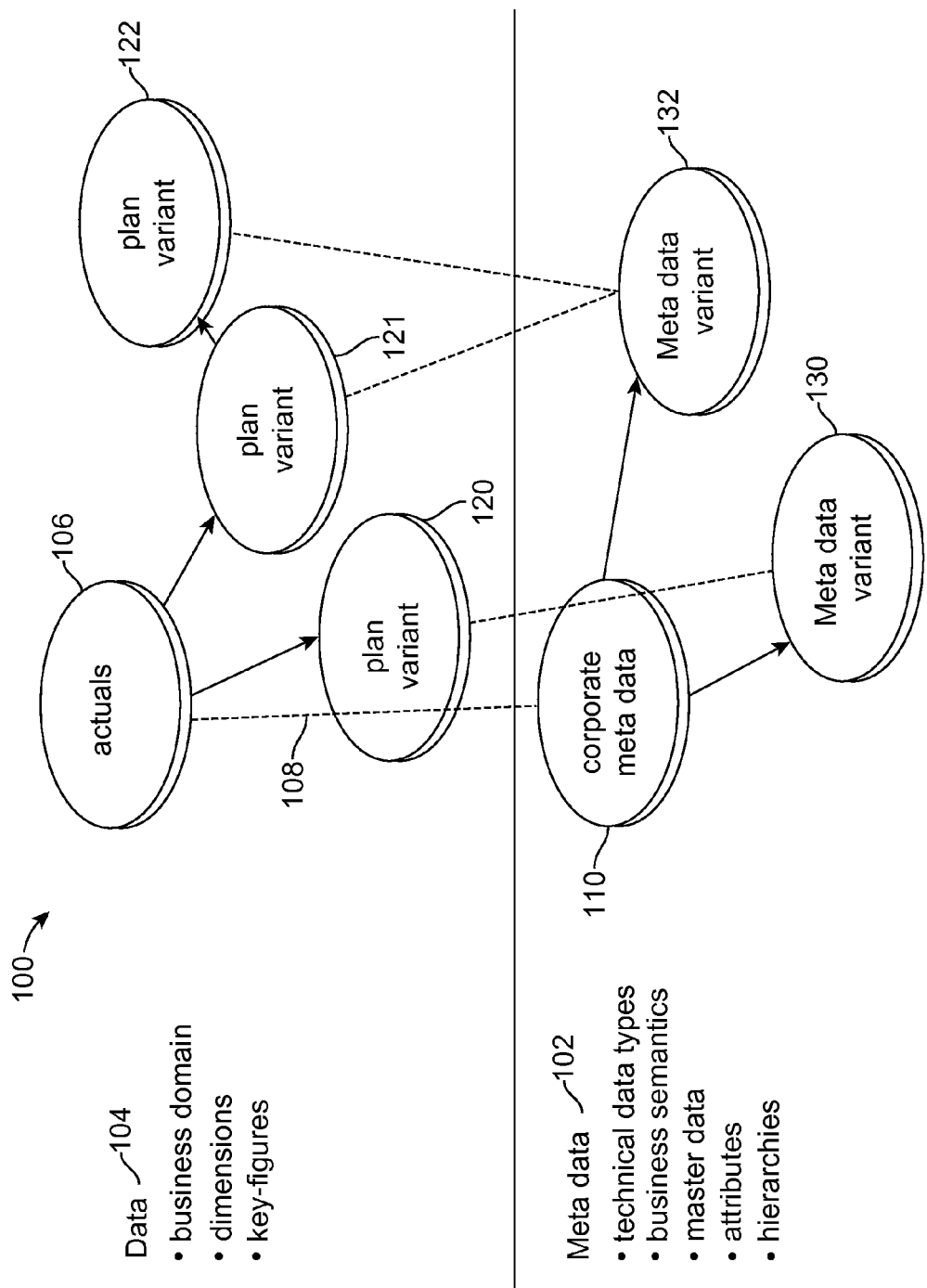
FIG. 1 is simplified figure illustrating meta data and data levels of a versioning concept according to an embodiment.

FIG. 1 shows a simplified view illustrating the variant concept for both meta data and data according to an embodiment. This variant concept reflects relationships between actual data and plan data, as well as relationships between data and meta-data.

In particular, the variant concept 100 comprises a meta data layer 102 and an overlying data layer 104. Information used in reporting and planning can be considered as meta data and data.

Data present in the overlying data layer 104 can comprise information such as:
  a business domain (e.g. sales numbers);
  key-figure values (e.g. revenue=100M$, sales volume=10.982 pc); and
  dimension values for those key-figures (e.g. country="USA", DATE="05/05/2012").

Meta data present in the underlying layer 102 comprises pieces of information that define semantics or context of another piece of information, which refers to it (e.g. data of data layer 104). Meta data is not necessarily plan-specific, even though this could be the case. Meta data describes either the structure or the content of the data, so that generic data bases and business applications can interpret the data.

Master data may be included in the term meta data. There might be embodiments that provide a separation between meta data and master data. Data is specific to either actuals or to a specific plan.

Meta data present in the meta data layer can comprise information such as:
  technical data types (e.g. DATE, INT);
  business semantics (e.g. "product category");
  master data (e.g. product "iPhone 4S"); and
  attributes (e.g. size); and
  hierarchies (e.g. organizational relations).

For the variant concept, variants for data are associated with versions of meta-data and vice versa, such that the data as well as its semantics can be versioned.

The data layer 104 comprises actual data 106 including operative past data offering global visibility into past events. The actual data may originate from one or more sources such as Enterprise Resource Planning (ERP) applications, Customer Relationship Management (CRM) applications, and/or Master Data Management (MDM) applications.

The actual data also reflects a relationship 108 to corporate meta data 110 present in the meta data layer 102. This corporate meta data can be operative data originating from an MDM offering global visibility.

According to embodiments of the variant concept, in order to utilize the actual data and corporate meta data for planning as well as reporting purposes, variants of the actual data and the corporate meta data may be created. In particular, FIG. 1 shows the creation of multiple plan variants 120-122.

Plan variants 120 and 121 are derived from the actual data as the root variant. The plan variants can comprise plan data, maintained in a plan session. The plan variants may offer a high number of frequent changes over the actual data, due to the actuals being hard facts that are defined and stable once all data is available. For example, the revenue of Q1 is defined by 1-April), whereas the plans are based upon assumptions that are influenced by a variety of factors (e.g. temperature forecast influences the planned sales volume of beverages). Changes to influencing factors can lead to a change of plans, either of an existing plan variant or by creating a new one.

The plan variants may be owned by a particular Line of Business (LOB). The plan variants may offer controlled visibility to users, as is discussed further below. Based on plans, a LOB might want to simulate best- and worst case scenarios (e.g. dry and warm summer vs. wet and cold summer). These plans might be sensitive and premature. They may not be visible to anybody outside the LOB without this context.

Each variant refers to a corresponding meta data variant present in the meta data layer. In particular, the plan variant 120 refers to meta data variant 130. Such a meta data variant can be maintained in plan session or in a separate environment for meta data maintenance. It can represent local modification of the corporate meta data, with a relatively low number of infrequent changes.

With the nature of meta data providing semantics for data, any change to meta data may have more structural impact than changing data. For example, a change in the acquisition strategy (affecting the location and product master data and hierarchies in the meta data) is rarer than a change in the weather forecast (affecting the sales volume plan data for beverages).

The meta data variants may be owned by a particular Line of Business (LOB). The meta data variants may offer controlled visibility to users, as is discussed further below. Based on a plan, a LOB might want to simulate different options in the future (e.g. acquisition of a new business domain, shutting down a location). These plans might be sensitive and premature. They may not be visible to anybody outside the LOB, in other plans or in actuals reporting.

FIG. 1 further shows that the plan variant 122 is derived from the plan variant 121 as an intermediate predecessor, rather than being derived directly from the actual data as the root variant. Accordingly, both of the plan variants 121 and 122 reference the same meta data variant 132. This is due to the fact that meta data change less frequently than normal data. Hence there might be several variants or versions of plan data for the same meta data variant.

In creating variants according to the variant concept, as a threshold matter the meta data of the actual data are generally treated as being stable. In particular, the actual data meta data have a well-defined structure, and describe well-defined semantics. This is understood as the root variant of meta data.

Based on this meta data, the data of the actual data are created and updated. At any given time, there exists a single true version of the actual data, which is the root variant of the data variant(s), even though those variant(s) might be changed over time.

Figure 2:
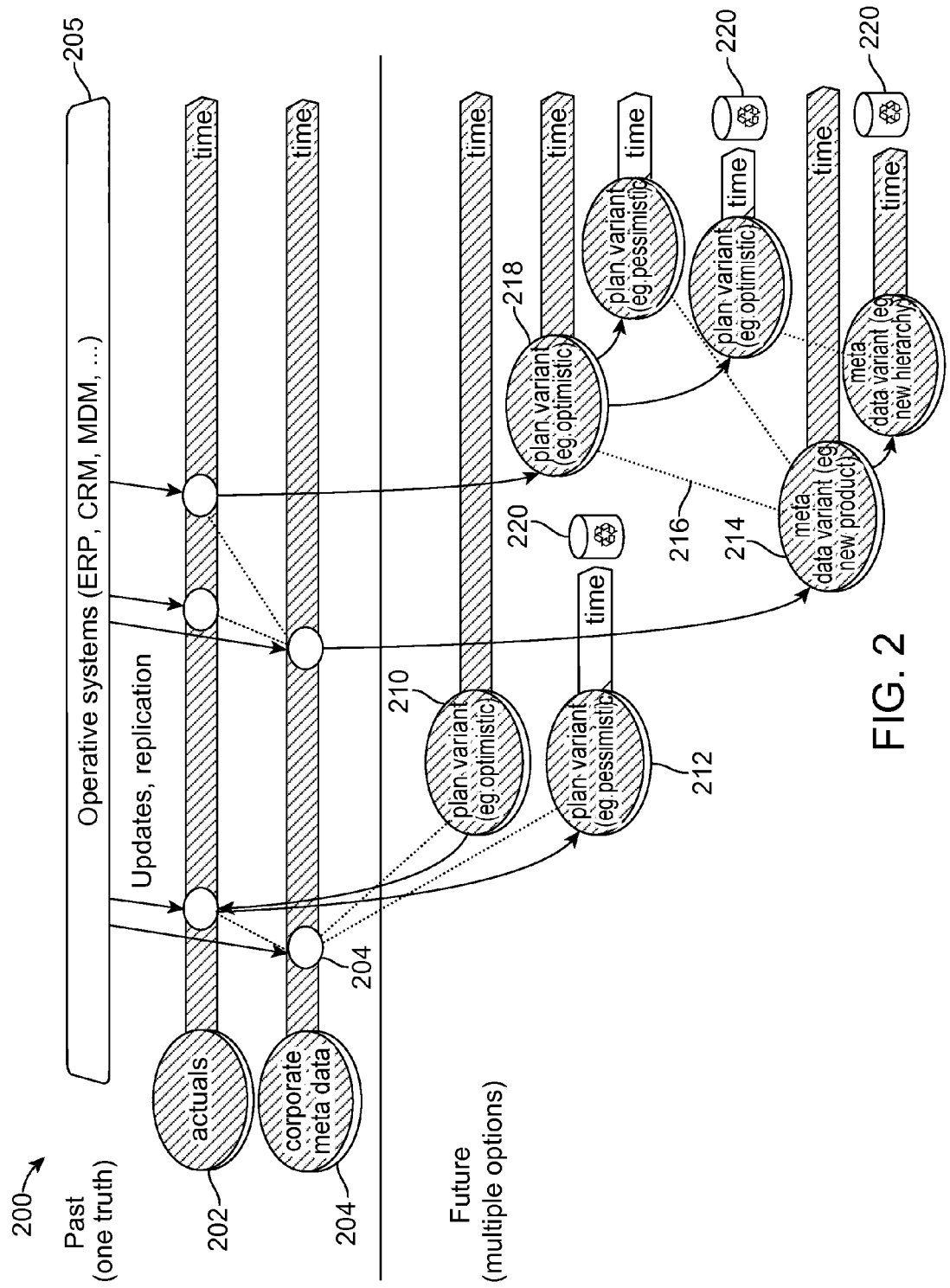
FIG. 2 is simplified figure illustrating the creation of different versions according to an embodiment.

At some point, a plan is to be derived from the actual data. FIG. 2 is a simplified view showing a sequence 200 of transitions from actual data, to multiple plans.

In particular, the actual data 202 represent a single truth corresponding to what has in fact occurred in the past. The corresponding underlying corporate meta data 204 provide a supporting framework for describing that actual data in a consistent manner across the many different situations in which actual data may arise in the real world. Both actual data and the corporate metadata may be obtained from an operative system 205 as described previously.

It is noted that the actuals and the corporate meta data may evolve over time (they may not be fully stable). But if a plan is created (e.g. for Q1 next year well after Q1 this year) the actual changes will not affect the Q1 numbers the plan was based upon. The same applies for the meta data, e.g. where seasonal products for summer should not affect Q1 plans for next year.

Figure 2A:
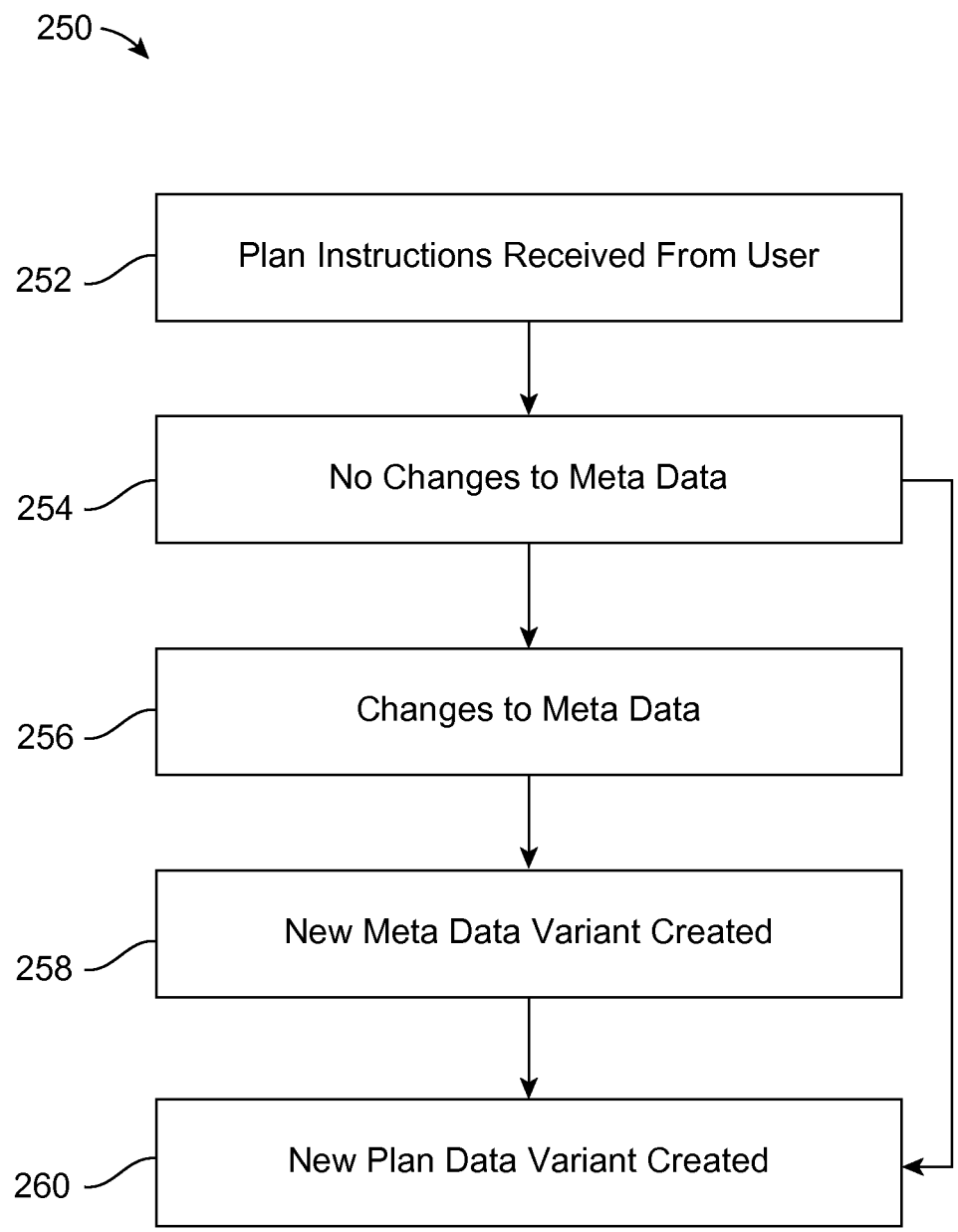
FIG. 2A is a simplified chart showing a process flow of transitioning from actual data to plan data.

FIG. 2A is a simplified chart showing a process flow 250 of transitioning from actual data to plan data. In a first step 252, instructions are received from a user indicating creation of a plan (e.g. specifying plan name, description, owner, due date).

In a second step 254 of transitioning from actual data to plan data, it may be recognized that a plan might not be accompanied by any changes to meta data. An example is the creation of plan data reflecting optimistic (i.e. reference no. 210) or pessimistic (i.e. reference no. 212) projections of the existing actual data, which may be updated over time. As shown in FIG. 2, such plan variants can readily be created (step 260) without requiring changes to underlying corporate meta data.

In a third step 256 of transitioning from actual data to plan data, it may be recognized that a new plan may involve changes to meta data. An example of such a change to meta data is inclusion of an entirely new product line into the plan, thereby calling for extension of the master data to reflect that new product line. Another example of such a change to meta data is to plan an organizational change, thereby calling for extension of the hierarchy of the master data. These changes shall not affect existing plans.

In step 258 the desired meta data are stored in a new meta data variant, along with a relation to the root meta data. In FIG. 2, plan variant 218 is based on new meta data variant 214, with evolution into subsequent plans and meta data also depicted. FIG. 2 shows a relationship 216 between the meta data variant 214 and the plan variant 214.

This relation may be achieved as delta or after-image. Conceptually, from an implementation perspective it might be more efficient to just store the changes between meta data versions and plan versions.

Next, in step 260 the values of the actual data are changed, such that they reflect information relating to future plans (e.g. with respect to time, revenue, sales volume figures, etc.) Those changed data are stored as a plan data variant 218, with relation to the root data and their timestamp. Again, whether this relation is achieved as delta or after-image, is of no difference.

Additional plans to be created later, could take into account further changes to meta data (e.g. for new markets or customer segments). In such additional plans, new variants of meta data are created based on their immediate predecessor variant. This is regardless of whether the immediate predecessor is the root variant or an intermediate variant.

Thus changes to meta data lead to new meta data variants, since such changes to meta data are less frequent than changes to data. Accordingly, with every meta data variant, a new plan data variant may be created.

Changes to plan data occur more frequently than do changes to meta data. Thus in certain embodiments, changes to plan data lead to an update of the timestamp rather than a new plan data variant. Again, while conceptually the variants need to be distinguished (e.g. to compare them), in particular embodiments this may be achieved by delta and timestamp, or by delta and variant-ID, or by copying and variant-ID.

However, an embodiment may provide the user with an option of forcing creation of a new plan data variant at any time. This may be regardless of whether the new plan data variant is based on the root variant or an intermediate variant.

There may not be a reason to create a new variant for every change of a plan. Such a variant may be created if a user wants to keep the plan for later reference. The user can decide this issue.

As indicated by the reference no. 220 in FIG. 2, plan data variants and/or meta data variants can be discarded at any time. This can in turn lead to invalidation of a succeeding variant, be it:
plan data subsequent to a discarded plan data variant,
plan data based on a discarded meta data variant,
meta data variants subsequent to a discarded meta data variant, or Thus certain embodiments may implement a governance plan for variant creation and management. The same functionality (including privileges) can be offered in different ways.

In some embodiments it may be provided by the end-users themselves via governance and conventions, i.e. the user copies over the plan he or she wants to create a new variant for (same applies to meta data). Also the correct application of privileges is controlled by the user. The system cannot provide any support, e.g. for the impact of the deletion of a variant.

In other embodiments, the databases control the variant process. The user indicates to the database that a new variant is to be created. The database handles this in whatever way optimal. A benefit is that the database can provide various support, like impact analysis and consistent variant handling for different applications/user groups.

Figure 3:
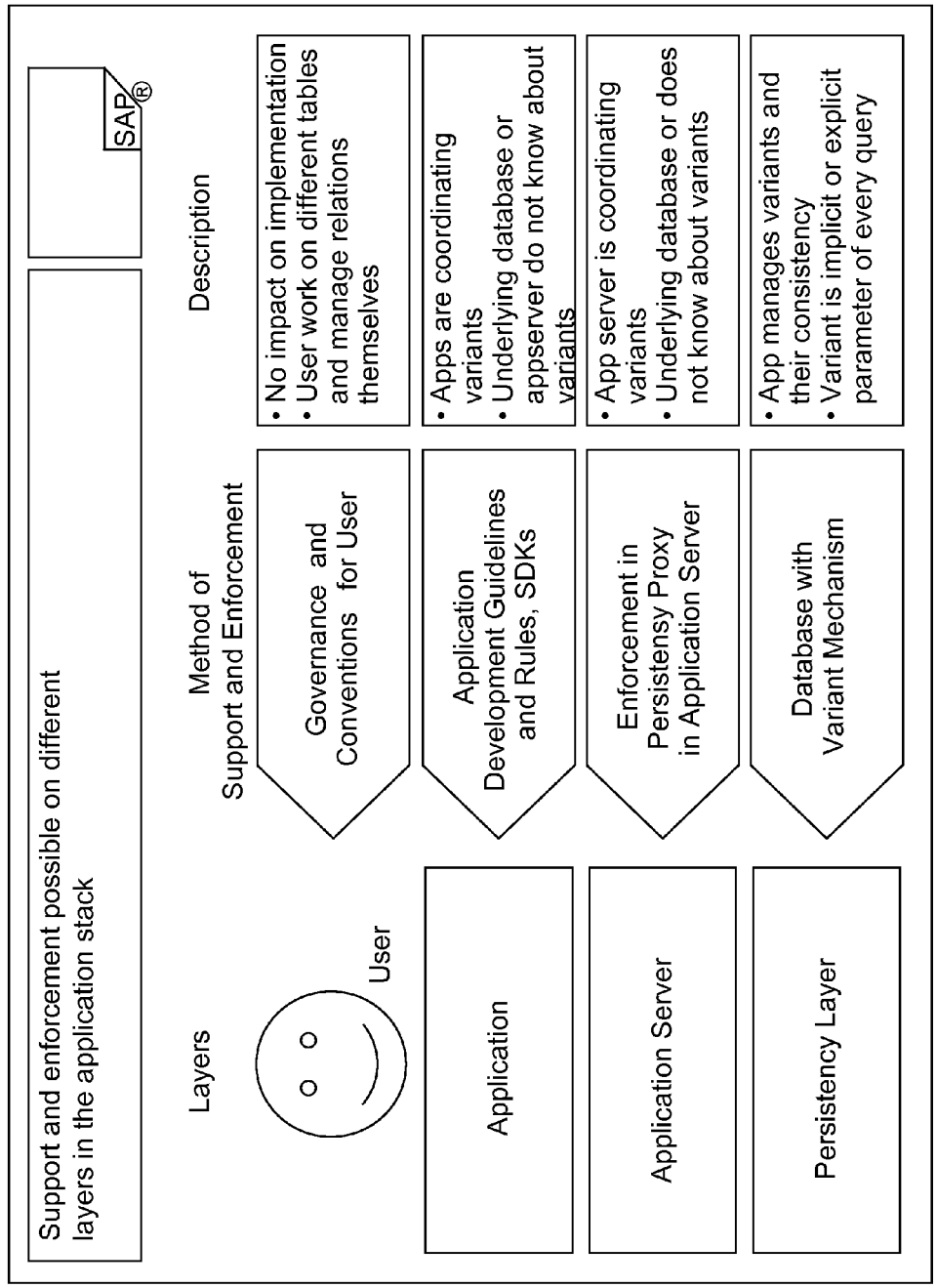
FIG. 3 is a simplified schematic diagram showing various levels and how the rules and logic for different variants can be implemented.

Different other implementations between these two extremes are possible. FIG. 3 shows that support and/or enforcement are possible on different layers in the application stack. For example, in some embodiments, every variant that is created may have privileges associated therewith. The privileges administered by a governance plan may determine visibility for variants. Thus, a specific meta data variant or plan variant may only be able to be viewed by a certain user or user group. This allows the implementation of sensitive changes to data/meta data, without visibility in other plans or in actual reporting.

The privileges administered by a governance plan may also determine the ability to modify existing variants and/or create succeeding variants. Thus, a specific meta data variant or plan variant may only be able to be maintained by a certain user or user group, thereby avoiding conflicts arising between changes made to versions by different groups.

Various embodiments of implementing a versioning concept may offer certain benefits. For example, by facilitating tracing of relationships between variants, embodiments may allow tracking of plan history. This can facilitate, for example, cutting-off all plans that are based on a meta data change that became obsolete during the planning cycle.

Moreover, by facilitating tracing of relationships between variants, embodiments may support the comparison between different plan variants. Thus while variants built on the same meta data variant may be readily compared/contrasted, for other variants changes to the meta data can be rendered transparent in order to emphasize semantic differences.

Figure 4:
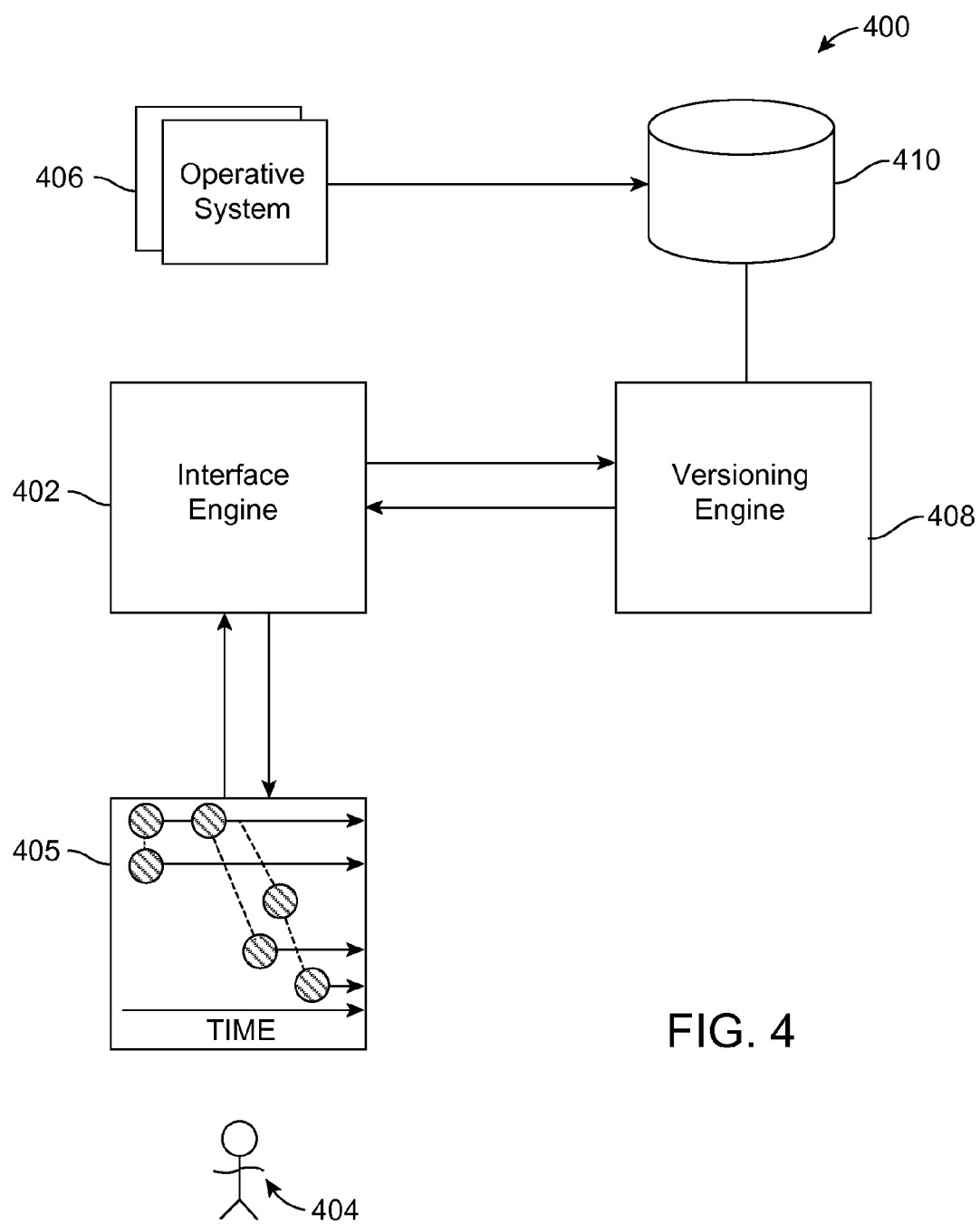
FIG. 4 shows a simplified block diagram of a system according to an embodiment.

FIG. 4 shows a simplified block diagram of a system according to an embodiment. In particular, the system 400 comprises a versioning engine 408 that is in communication with a data warehouse 410. The data warehouse has data stored therein corresponding to a root variant (e.g. actual data and corporate meta data). Such data may be communicated to the data warehouse from an operative system 406 (e.g. CRM, ERP, or MDM system).

The versioning engine may be located in the data warehouse, or may be part of an application layer that is configured to interact with the data warehouse. The versioning engine is configured to create from the root variant information, data and meta data variants as described extensively above. The versioning engine may also implement governance over variants that are being created.

Such data and variants may be created based upon information and instructions received from a user 404 via an interface engine 402. The interface engine may in turn communicate back to the user via an interface 405, a visual depiction of data variants and/or meta data variants, and the evolution thereof over time.

While both FIGS. 4 and 2 depict the variant concept in the form of a horizontally-oriented timeline, this is not required. One alternative example of a format offering visual depiction of variants according to embodiments, is a vertically-oriented tree structure having a trunk representing root variants of data and meta data, branches representing intermediate predecessor variants, and leaves representing final or discontinued variants. Other examples of display formats include but are not limited to: a bread-crumb pattern for predecessor variants, set-based visualization of $1^{st}$ grade relative variants (on the same meta data variant), $2^{nd}$ grade relative variants (with the same predecessor meta data variant) etc.

Interfaces may rely upon a variety of techniques, employed alone or in combination, to display variant information (e.g. timestamps, designation of data, designation of meta data, designation of actual data, designation of corporate meta data, relationships etc.) according to embodiments. Examples of such techniques include but are not limited to the use of colors, shapes, line size/dashing, cross-hatching, animations, sound, and others.

According to embodiments, the variant concept may be turned into a generic solution with extended services, like variant racking and comparison.

By providing the variant concept on the database level (i.e. close to the data and meta data persistency), it is available to applications accessing that data. This allows a variety of different applications to operate from a harmonized variant model.

In certain embodiments the variants concept might be available on the application layer. It then might be optimized for the applications needs, but may not provide an interoperable variant concept across applications.

Examples of such different applications include but are not limited to the following business applications available from SAP AG of Walldorf, Germany:
Businessobjects Planning and Consolidation (BPC);
Customer Relationship Management (CRM) Trade Promotion Management (TPM);
SAP Planning for Retail;
Custom applications built on BW integrated planning (BW-IP) or the Planning applications kit (PAK).

Figure 5:
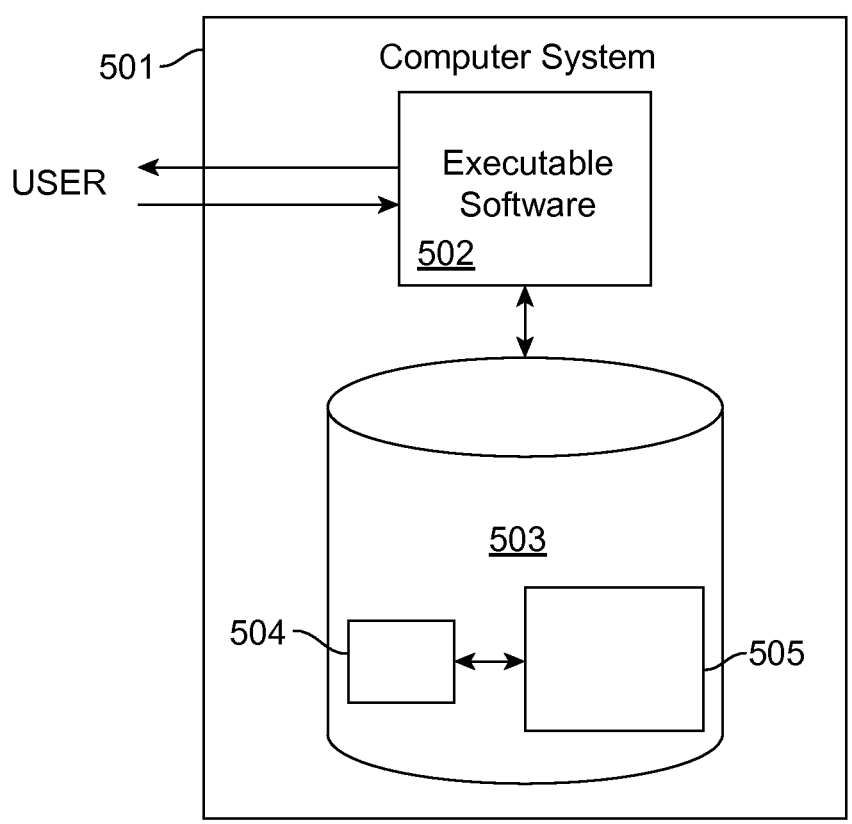
FIG. 5 illustrates hardware of a special purpose computing machine configured to implement a versioning concept according to an embodiment.

FIG. 5 illustrates hardware of a special purpose computing machine configured to implement a versioning concept according to an embodiment. In particular, computer system 500 comprises a processor 502 that is in electronic communication with a non-transitory computer-readable storage medium 503. This computer-readable storage medium has stored thereon code 505 corresponding to a versioning engine. Code 504 corresponds to an interface engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 6:
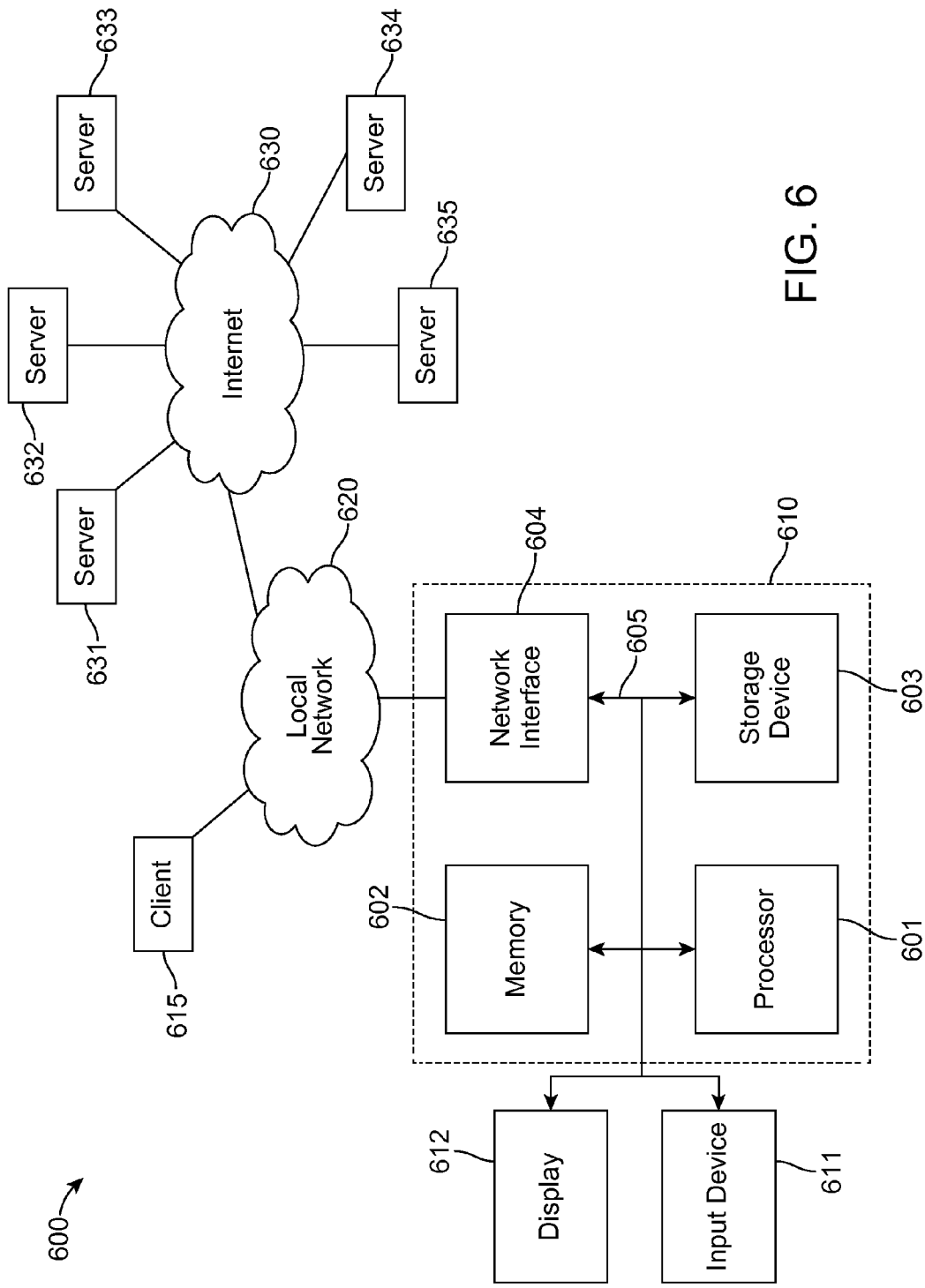
FIG. 6 illustrates an example of a computer system.

An example computer system 610 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
causing a versioning engine to receive actual data and meta data from a data warehouse;
causing the versioning engine to receive from an interface engine, a first instruction comprising creating a plan from the actual data;
causing the versioning engine to create a first data variant comprising a root data variant, and a corresponding first meta data variant based upon the first instruction;
causing the versioning engine to communicate with the interface engine to display a representation comprising a horizontally-oriented timeline including the actual data, the meta data, the first data variant, the first meta data variant below the first data variant, and a relationship between the first data variant and the first meta data variant comprising a first connecting line;
causing the versioning engine to receive a second instruction from an interface engine;
causing the versioning engine to create a plan data variant from the root data variant based upon the second instruction, the plan data variant comprising a new type of information not present in the root data variant;
causing the versioning engine to communicate with the interface engine to display an updated representation comprising the timeline further including the plan data variant and a relationship between the plan data variant and the root data variant comprising a second connecting line;
causing the versioning engine to create a second meta data variant based upon the second instruction, the second meta data variant referencing the new type of information; and
causing the versioning engine to communicate with the interface engine to display a further updated representation comprising the timeline further including the second meta data variant and a relationship between the second meta data variant and the plan data variant comprising a third connecting line.

2. A method as in claim 1 wherein the relationship between the first data variant and the first meta data variant is established by delta or by after-imaging.

3. A non-transitory computer readable storage medium embodying a computer program for performing a method, said method comprising:
causing a versioning engine to receive actual data and meta data from a data warehouse;
causing the versioning engine to receive from an interface engine, a first instruction comprising creating a plan from the actual data;
causing the versioning engine to create a first data variant comprising a root data variant, and a corresponding first meta data variant based upon the first instruction;
causing the versioning engine to communicate with the interface engine to display a representation comprising a horizontally-oriented timeline including the actual data, the meta data, the first data variant, the first meta data variant below the first data variant, and a relationship between the first data variant and the first meta data variant comprising a first connecting line;
causing the versioning engine to receive a second instruction from an interface engine;
causing the versioning engine to create a plan data variant from the root data variant based upon the second instruction, the plan data variant comprising a new type of information not present in the root data variant;
causing the versioning engine to communicate with the interface engine to display an updated representation comprising the timeline further including the plan data variant and a relationship between the plan data variant and the root data variant comprising a second connecting line;
causing the versioning engine to create a second meta data variant based upon the second instruction, the second meta data variant referencing the new type of information; and
causing the versioning engine to communicate with the interface engine to display a further updated representation comprising the timeline further including the second meta data variant and a relationship between the second meta data variant and the plan data variant comprising a third connecting line.

4. A non-transitory computer readable storage medium as in claim 3 wherein the relationship between the first data variant and the first meta data variant is established by delta or by after-imaging.

5. A computer system comprising:
one or more processors;
a software program, executable on said computer system, the software program configured to:
cause a versioning engine to receive actual data and meta data from a data warehouse;
cause the versioning engine to receive from an interface engine, a first instruction comprising creating a plan from the actual data;
cause the versioning engine to create a first data variant comprising a root data variant, and a corresponding first meta data variant based upon the first instruction;
cause the versioning engine to communicate with the interface engine to display a representation comprising a horizontally-oriented timeline including the actual data, the meta data, the first data variant, the first meta data variant below the first data variant, and a relationship between the first data variant and the first meta data variant comprising a first connecting line;
cause the versioning engine to receive a second instruction from an interface engine;
cause the versioning engine to create a plan data variant from the root data variant based upon the second instruction, the plan data variant comprising a new type of information not present in the root data variant;

cause the versioning engine to communicate with the interface engine to display an updated representation comprising the timeline further including the plan data variant and a relationship between the plan data variant and the root data variant comprising a second connecting line;

cause the versioning engine to create a second meta data variant based upon the second instruction, the second meta data variant referencing the new type of information; and cause the versioning engine to communicate with the interface engine to display a further updated representation comprising the timeline further including the second meta data variant and a relationship between the second meta data variant and the plan data variant comprising a third connecting line.

6. A computer system as in claim 5 wherein the relationship between the first data variant and the first meta data variant is established by delta or by after-imaging.

* * * * *